United States Patent
Adams et al.

(10) Patent No.: US 10,382,337 B2
(45) Date of Patent: Aug. 13, 2019

(54) IN MULTIMEDIA CONFERENCING

(71) Applicant: Pexip AS, Lysaker (NO)

(72) Inventors: Gregory Adams, Berkshire (GB); John Robert Bassett, Berkshire (GB); Nicolas Cormier, Oslo (NO); Håvard Graff, Oslo (NO); Eoin Stuart McLeod, Reading (GB)

(73) Assignee: Pexip AS, Lysaker (NO)

( * ) Notice: Subject to any disclaimer, the term of this patent is extended or adjusted under 35 U.S.C. 154(b) by 110 days.

(21) Appl. No.: 15/485,956

(22) Filed: Apr. 12, 2017

(65) Prior Publication Data
US 2017/0295102 A1   Oct. 12, 2017

(30) Foreign Application Priority Data

Apr. 12, 2016   (NO) .................................. 20160593

(51) Int. Cl.
| | |
|---|---|
| *H04L 29/06* | (2006.01) |
| *H04L 12/803* | (2013.01) |
| *H04N 7/15* | (2006.01) |
| *H04L 12/18* | (2006.01) |
| *H04L 29/08* | (2006.01) |

(52) U.S. Cl.
CPC ........ *H04L 47/125* (2013.01); *H04L 12/1827* (2013.01); *H04L 65/00* (2013.01); *H04L 65/1069* (2013.01); *H04L 65/403* (2013.01); *H04L 65/608* (2013.01); *H04L 65/80* (2013.01); *H04N 7/152* (2013.01)

(58) Field of Classification Search
USPC .......................................................... 709/224
See application file for complete search history.

(56) References Cited

U.S. PATENT DOCUMENTS

| | | | | |
|---|---|---|---|---|
| 8,032,934 | B2 * | 10/2011 | Chen ..................... | H04L 63/029 709/231 |
| 8,631,134 | B2 * | 1/2014 | Ceragioli ................ | H04L 63/20 709/201 |
| 9,210,200 | B1 * | 12/2015 | Chapweske ......... | H04L 65/4038 |
| 2004/0003099 | A1 * | 1/2004 | House ................. | H04L 67/1006 709/229 |

(Continued)

OTHER PUBLICATIONS

Norwegian Office Action dated Jan. 17, 2018, for Norwegian Application No. 20160593, Filing Date: Apr. 12, 2016 consisting of 4-pages.

*Primary Examiner* — Jude Jean Gilles
(74) *Attorney, Agent, or Firm* — Christopher & Weisberg, P.A.

(57) ABSTRACT

Load balancing in a multimedia conference is disclosed, involving one or more internal terminals and one or more internal nodes separated from one or more external terminals and one or more external nodes by a firewall. Media data is forwarded through the firewall to at least a second one of the nodes, and received media data at the at least a second one of said nodes are processed. At a first event, reconfiguration is performed of said first one of said nodes to process received media data and of said second one of said nodes to forward received media data to said first one of said nodes. At a second event, loading is done of at least a part of said received media data being processed at the first one or second one of said nodes to at least a third one of said nodes.

18 Claims, 3 Drawing Sheets

(56) References Cited

U.S. PATENT DOCUMENTS

| | | | |
|---|---|---|---|
| 2004/0205250 A1* | 10/2004 | Bain | H04L 67/1008 709/249 |
| 2008/0005293 A1 | 1/2008 | Bhargava et al. | |
| 2008/0301794 A1* | 12/2008 | Lee | H04L 63/0281 726/11 |
| 2009/0037583 A1* | 2/2009 | Alessandri | H04L 29/12367 709/225 |
| 2010/0131656 A1 | 5/2010 | Tsym | |
| 2013/0042317 A1 | 2/2013 | Nakashima | |
| 2013/0154369 A1* | 6/2013 | Kim | H02J 3/28 307/26 |
| 2014/0143854 A1 | 5/2014 | Lopez et al. | |
| 2014/0222963 A1* | 8/2014 | Gangadharan | H04L 65/1016 709/219 |
| 2014/0267569 A1 | 9/2014 | Periyannan et al. | |
| 2014/0267571 A1 | 9/2014 | Periyannan et al. | |
| 2014/0280995 A1* | 9/2014 | Ezell | H04L 65/1016 709/229 |
| 2016/0099871 A1 | 4/2016 | Chiduruppa et al. | |

* cited by examiner

IN MULTIMEDIA CONFERENCING

CROSS-REFERENCE TO RELATED APPLICATIONS

This application claims priority to Norwegian Patent Application No. 20160593, filed Apr. 12, 2016, the entirety of which is incorporated herein by reference.

STATEMENT REGARDING FEDERALLY SPONSORED RESEARCH OR DEVELOPMENT n/a

TECHNICAL FIELD

The present invention relates to providing load balancing and resource optimization in a multimedia communication.

BACKGROUND

Transmission of moving pictures in real-time is employed in several applications like e.g. video conferencing, net meetings and video telephony.

Video conferencing systems allow for simultaneous exchange of audio, video and data information among multiple conferencing sites. Systems known as Multipoint Control Units (MCUs) perform switching functions to allow the endpoints of multiple sites to intercommunicate in a conference. The MCU links the sites together by receiving frames of conference signals from the sites, processing the received signals, and retransmitting the processed signals to appropriate sites. The conference signals include audio, video, data and control information. In a switched conference, the video signal from one of the conference sites, typically that of the loudest speaker, is broadcast to each of the participants. In a continuous presence conference, video signals from two or more sites are spatially mixed to form a composite video signal for viewing by conference participants. When the different video streams have been mixed together into one single video stream, the composed video stream is transmitted to the different parties of the video conference, where each transmitted video stream preferably follows a set scheme indicating who will receive what video stream. In general, the different users prefer to receive different video streams. The continuous presence or composite video stream is a combined picture that may include live video streams, still images, menus or other visual images from participants in the conference.

Video conferencing between separated networks need also some kind of arrangements to traverse firewalls, because firewalls usually do not accept standardized communication sessions, such as session initiation protocol (SIP), H.323 and WebRTC, to cross a network edge e.g. the edge of an enterprise network. Such arrangements may include proxies outside and inside the enterprise network, making the communication between the proxies acceptable for the firewall.

FIG. 1 illustrates an example of a firewall traversal setup according to prior art. In this example, three video conferencing terminals participate in a conference call, and two nodes (e.g. MCUs) are facilitating the call. Terminal 1 and Terminal 2 connected to Conferencing Node A, are all located outside an enterprise firewall, and Terminal 3 as well as Node B, to which it is connected, are located behind the enterprise firewall. Node A is transcoding the mixed conference.

Terminal 3 connects to Conferencing Node B. Conferencing Node B hosts a transcoded and mixed MCU conference B, which is cascaded to the MCU conference on Conferencing Node A. In this case, standardized communication sessions as established between the terminals and the nodes, as well as between the nodes A and B crossing the firewall. Then certain firewall traversal arrangements must be present for the communication sessions to be accepted by the firewall. The communication topology is also fixed during a conference. This is a drawback and it will increase along with growing demand for real-time HD multimedia data traffic requiring a more fragmented and distributed multimedia data processing and bandwidth usage.

SUMMARY

In view of the above, an object of the present disclosure is to overcome or at least mitigate at least some of the drawbacks related to prior art multimedia conferencing systems.

This object is achieved, in a first aspect, by a method for load balancing in a multimedia conference involving one or more internal terminals and one or more internal nodes separated from one or more external terminals and one or more external nodes by a firewall. Media data from at least one of said terminals received at at least a first one of said nodes are forwarded through the firewall to at least a second one of the nodes, and received media data at the at least a second one of said nodes are processed by the second one of the nodes. The method comprises:

at a first event, reconfiguring said first one of said nodes to process received media data, and reconfiguring said second one of said nodes to forward received media data to said first one of said nodes, at a second event, loading at least a part of said received media data being processed at the first one or second one of said nodes to at least a third one of said nodes.

That is an advantage the present disclosure is that it provides balancing of media data processing load (e.g. transcoding) between nodes and also an optimization of bandwidth usage. This balancing may be performed so-called "on the fly", meaning that it is transparent to any terminal involved in an ongoing session.

In another aspect, there is provided node for load balancing in a multimedia conference involving one or more internal terminals and one or more internal nodes separated from one or more external terminals and one or more external nodes by a firewall. Media data from at least one of said terminals received at at least a first one of said nodes are forwarded through the firewall to at least a second one of said nodes, and received media data at the at least a second one of said nodes are processed by said second one of said nodes. The node comprises input/output circuitry, a processor and a memory. The memory contains instructions executable by the processor whereby the node is operative to:

at a first event, reconfigure said first one of said nodes to process received media data, and reconfigure said second one of said nodes to forward received media data to said first one of said nodes, at a second event, load at least a part of said received media data being processed at the first one or second one of said nodes to at least a third one of said nodes.

In another aspect there is provided a computer program, comprising instructions which, when executed on at least one processor in a node, cause the node to carry out the method as summarized above in connection with the first aspect and the various embodiments of this aspect.

In another aspect there is provided a carrier comprising a computer program according to the summarized aspect above, wherein the carrier is one of an electronic signal, an optical signal, a radio signal and a computer readable storage medium.

These other aspects provide the same effects and advantages as summarized above in connection with the method of the first aspect.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

According to embodiments herein, the abovementioned disadvantages of the present invention are eliminated.

Figure 1:
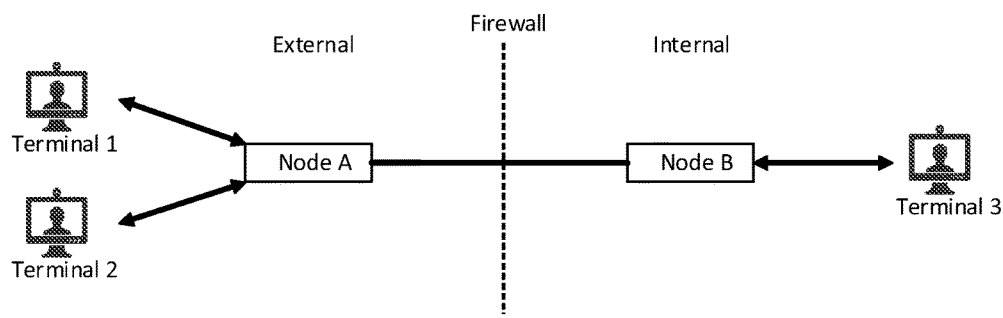
FIG. 1 is an illustration of a prior art scenario.
Figure 2:
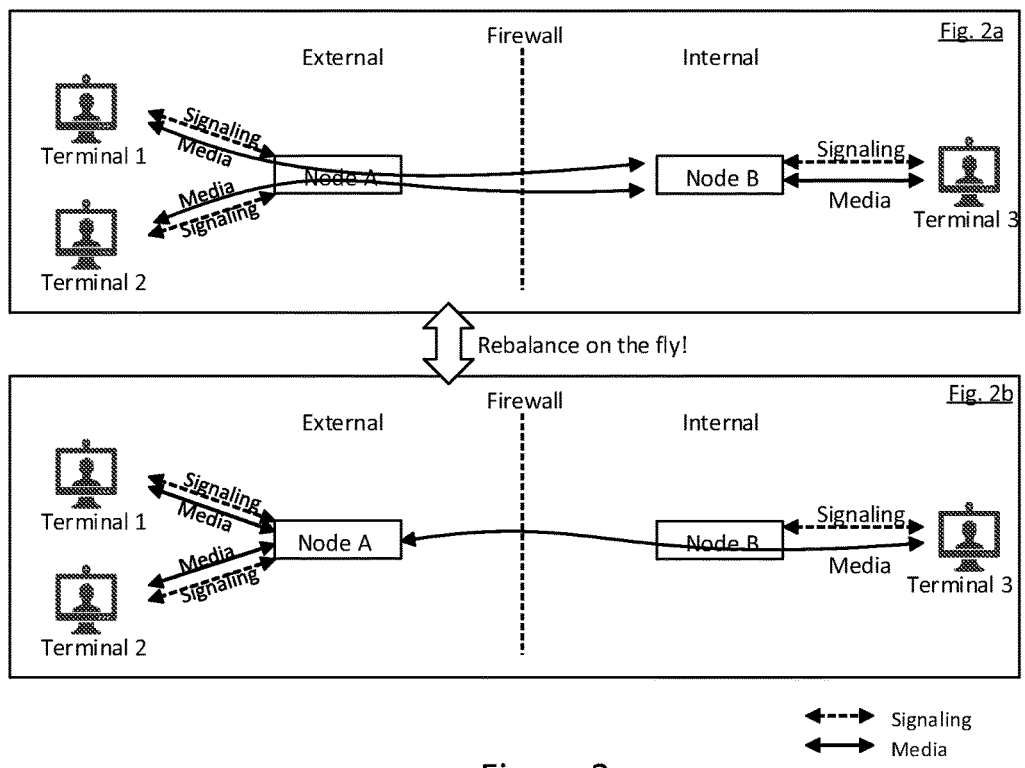
FIG. 2 illustrates a first example scenario according to the present invention.

A first example scenario according to the present invention is illustrated in FIG. 2a and FIG. 2b. As illustrated in FIG. 1, there is a conference with three Terminals 1, 2 and 3. Terminals 1 and 2 are external to a firewall, and connect to External Node A (e.g. an MCU). Terminal 3 is internal to the firewall, and connects to Internal Node B (e.g. an MCU).

As can be seen from FIG. 2a, External Node A simply forwards (i.e. acts as a proxy) media data from the external terminals 1 and 2 to Internal Node B via two media streams. Standardized communication sessions (e.g. SIP, H.323, WebRTC) are only established between terminals and nodes. Hence, since Node A is not processing the media data, it uses relatively little processing resources (e.g. central processing unit (CPU) usage).

Internal Node B handles all the media processing/transcoding for the entire conference, and uses a lot of CPU.

Furthermore, since two HD streams are forwarded through the corporate firewall, this configuration uses relatively large amounts of bandwidth.

During the conference, when a certain event occurs, either automatically or through manual intervention from an administration user interface, Internal Node B is reconfigured to forward media to External Node A, and External Node A is reconfigured to do all media processing/transcoding for the conference. This case is illustrated in FIG. 2b. The certain event may occur because Node B has less CPU power available, or for other reasons. It may also be due to a desire to use less bandwidth through the corporate firewall. As an example, when Node B exceeds a first predefined load level and Node A is below a second predefined load level, this will trigger the event to transfer from the topology of FIG. 2a to the topology of FIG. 2b. The same transfer may also occur when bandwidth usage through the firewall exceeds a predefined bandwidth usage level.

Figure 3:
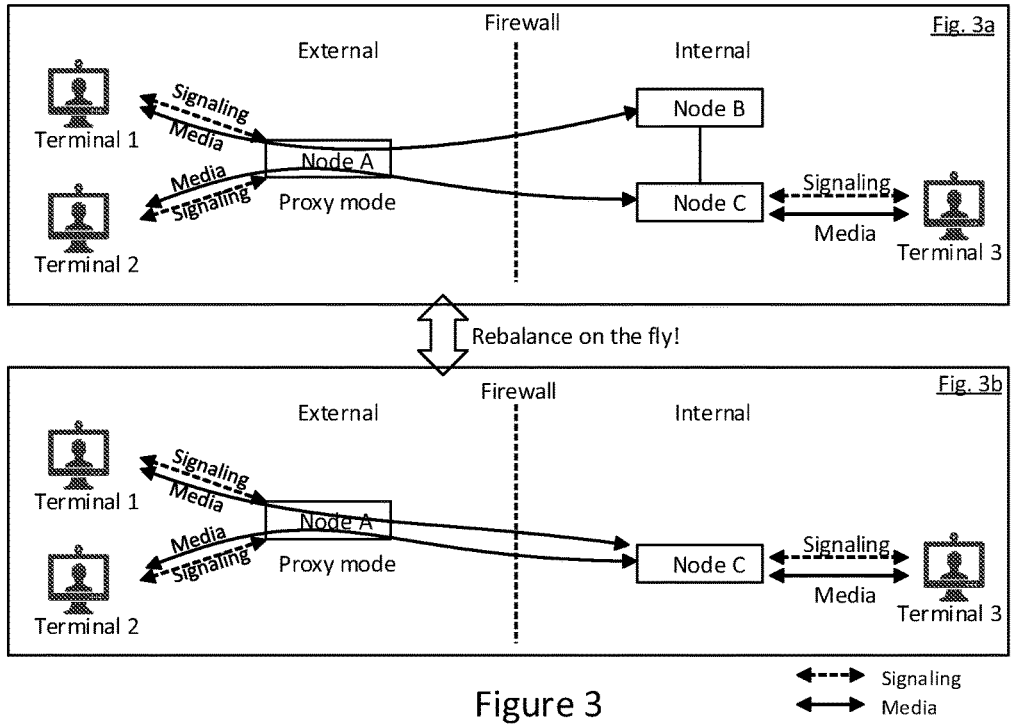
FIG. 3 illustrates a second example scenario according to the present invention.

A second example scenario according to the present invention is illustrated in FIG. 3a and FIG. 3b. The setup and topology illustrated in FIG. 3a is the same as for FIG. 2a except for that there are two Internal Nodes B and C, and the Internal Nodes B and C share the handling of all the media processing/transcoding of the conference.

External Node A knows that the conference is split across two internal Nodes B and C, and is forwarding media from the two external terminals 1 and 2 to the two different internal nodes B and C.

During the conference, when a certain event occurs, a rebalancing of the use of conferencing nodes on the Internal Network is carried out. The event may be initiated automatically (e.g. through the discovery of having sufficient CPU resources on Node C to handle the entire processing load for the conference) or manually through administrator intervention from an administration user interface. As an example, when Node B goes below a first predefined load level, Node A is not below a second predefined load level and Node C is below a third predefined load level, this will trigger the event to transfer from the topology of FIG. 3a to the topology of FIG. 3b.

In this case, Node C assumes all the media processing for the conference, Node B is removed from the conference, and Node A changes the destination for the forwarded media accordingly as illustrated in FIG. 3b.

The Terminals connected to the conference are unaware of this change of topology, they see no changes, since they just relate to the standardized communication sessions established with one node.

Changing from Scenario 3b to Scenario 3a is of course also possible, such as when there is a need for more CPU in any of the nodes.

Figure 4:
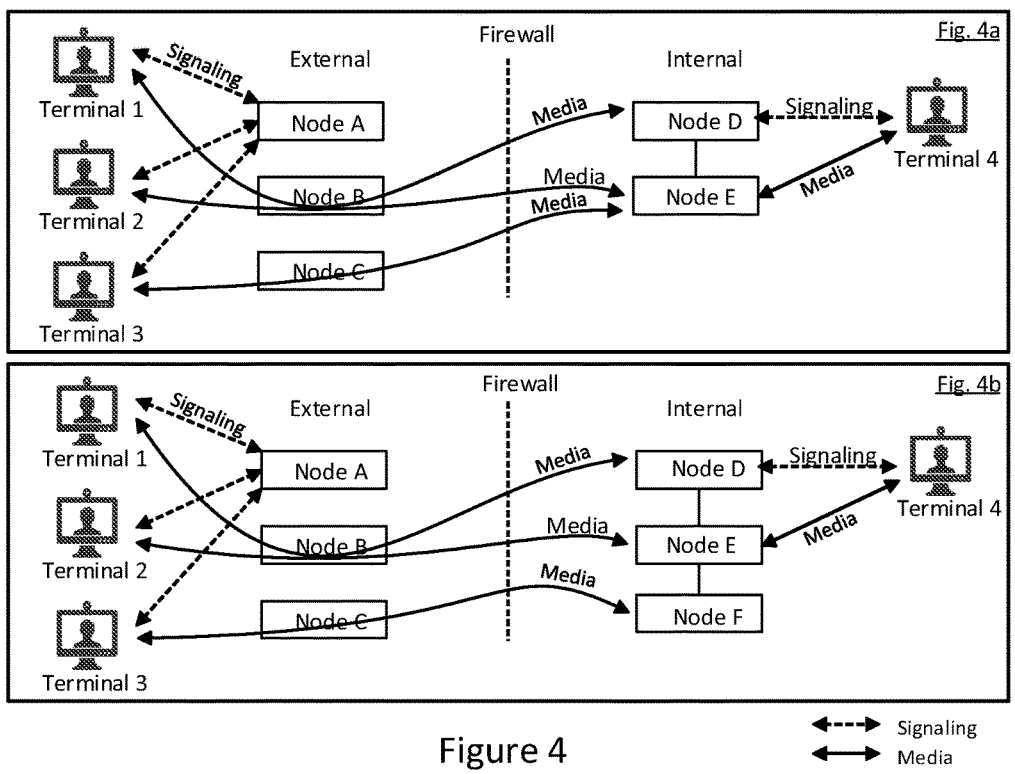
FIG. 4 illustrates an extension of the second example scenario according to the present invention.

An extension of the second example scenario according to the present invention is illustrated in FIG. 4a and FIG. 4b. As already mentioned, the connection from the Terminals (internal and external) to their respective nodes uses standards based signaling (SIP, H.323, WebRTC, etc) and media, which may be transported via suitable protocols including real-time transport protocol (RTP), RTP control protocol (RTCP), real-time messaging protocol (RTMP), etc. Hence, the connections between Nodes are not visible to the Terminals and may change during a conference. Media data between nodes, and even from terminals to nodes, is forwarded without standardized communication session being established between them.

Therefore, in order to accomplish load balancing of either CPU resources or bandwidth, transcoding nodes may be added or deleted from the conference at any time for the duration of the conference, without affecting the Terminals connected to the conference. A conference configuration may therefore change from the topology illustrated in FIG. 4a to the topology illustrated in 4b if e.g. more CPU processing power is required, and vice versa if less CPU processing power is required.

Figure 5:
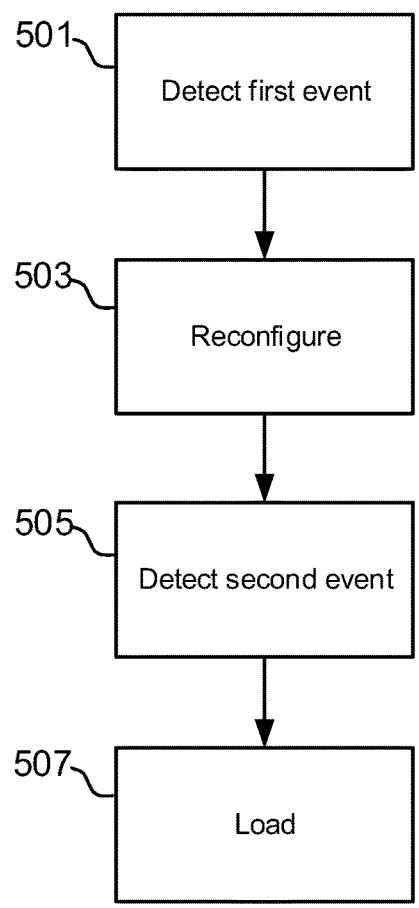
FIG. 5 is a flowchart of a method, and FIG. 6 schematically illustrates a block diagram of a node.

Now, with reference to FIG. 5, scenarios as described above in connection with FIGS. 2, 3 and 4 may be realized by any node involved in a multimedia conference. Such a realization may be described in terms of actions performed by the node. The actions are for load balancing in a multimedia conference involving one or more internal terminals and one or more internal nodes separated from one or more external terminals and one or more external nodes by a firewall, wherein media data from at least one of said terminals received at at least a first one of said nodes are forwarded through the firewall to at least a second one of said nodes, and received media data at the at least a second one of said nodes are processed by said second one of said nodes.

The load balancing may be a load balancing of processing and/or bandwidth usage. The media data may be audio and video formatted according to Real-time Transport Protocol (RTP) or Real Time Messaging Protocol (RTMP) etc.

The first one of said nodes may in some embodiments be among said one or more external nodes. In other embodiments, said first one of said nodes may be among said one or more internal nodes.

Embodiments include those where standardized communication sessions according to H.323, Session Initiation Protocol, SIP or WebRTC are only established between the one or more internal terminals and one or more internal nodes, and between the one or more external terminals and one or more external nodes, respectively, and forwarding of media data between the nodes are depending on standardized communication sessions.

The actions may comprise details as follows:

Action 501

A first event is detected.

For example, the first event may occur when said second one of said nodes exceeds a first predefined load level and said first one of said nodes is below a second predefined load level.

The first event may also or alternatively occur by a manual instruction from an administration user interface (the administration interface being implemented, e.g., in any of the nodes).

Action 503

As a consequence of the detection of the first event, a reconfiguration is performed of said first one of said nodes to process received media data, and a reconfiguration is performed of said second one of said nodes to forward received media data to said first one of said nodes.

Action 505

A second event is detected.

For example, the second event may occur when said second one of said nodes goes below a first predefined load level, said first one of said nodes is above a second predefined load level and said third one of said nodes is below a third load level.

The second event may also or alternatively occur by a manual instruction from an administration user interface (the administration interface being implemented, e.g., in any of the nodes).

Action 507

As a consequence of the detection of the second event, loading is performed of at least a part of said received media data being processed at the first one or second one of said nodes to at least a third one of said nodes.

For example, the at least a part of said received media data being processed at the first one or second one of said nodes may all be media being processed at the second one or first one of said nodes.

In such embodiments, instructions may be provided such that terminals currently being transmitting and nodes currently being forwarding said received media at the second one or first one of said nodes, start transmit or forward said received media data to the third one of said nodes.

Figure 6:
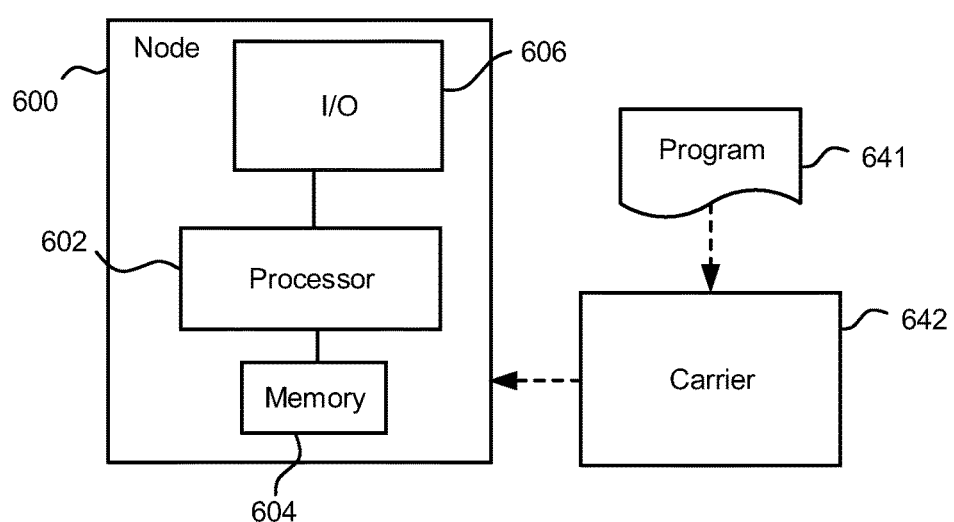

Turning now to FIG. 6, a schematically illustrated node 600 (e.g. any of the nodes A-F illustrated in FIGS. 2-4) will be described in some more detail. The node 600 is for load balancing in a multimedia conference involving one or more internal terminals (e.g. any of the terminals 1, 2, 3, 4 illustrated in FIGS. 2-4) and one or more internal nodes separated from one or more external terminals and one or more external nodes by a firewall. Media data from at least one of said terminals received at at least a first one of said nodes are forwarded through the firewall to at least a second one of said nodes, and received media data at the at least a second one of said nodes are processed by said second one of said nodes. The node 600 comprises input/output circuitry 606, a processor 602 and a memory 604. The memory 604 contains instructions executable by the processor 602 whereby the node 600 is operative to:

at a first event, reconfigure said first one of said nodes to process received media data, and reconfigure said second one of said nodes to forward received media data to said first one of said nodes, at a second event, load at least a part of said received media data being processed at the first one or second one of said nodes to at least a third one of said nodes.

The instructions that are executable by the processor 602 may be software in the form of a computer program 641. The computer program 641 may be contained in or by a carrier 642, which may provide the computer program 641 to the memory 604 and processor 602. The carrier 642 may be in any suitable form including an electronic signal, an optical signal, a radio signal or a computer readable storage medium.

In some embodiments, the node 600 is operative such that said first one of said nodes are among said one or more external nodes.

In some embodiments, the node 600 is operative such that said first one of said nodes are among said one or more internal nodes.

In some embodiments, the node 600 is operative such that the at least a part of said received media data being processed at the first one or second one of said nodes are all media being processed at the second one or first one of said nodes, and operative to instruct terminals currently being transmitting and, nodes currently being forwarding said received media at the second one or first one of said nodes to start transmitting or forwarding said received media data to the third one of said nodes.

In some embodiments, the node 600 is operative such that media data are audio and video formatted according to Real-time Transport Protocol (RTP) or Real Time Messaging Protocol (RTMP).

In some embodiments, the node 600 is operative such that standardized communication sessions according to H.323, Session Initiation Protocol (SIP) or WebRTC are only established between the one or more internal terminals and one or more internal nodes, and between the one or more external terminals and one or more external nodes, respectively, and forwarding of media data between the nodes are depending on standardized communication sessions.

In some embodiments, the node 600 is operative such that the first event occurs when said second one of said nodes exceeds a first predefined load level and said first one of said nodes is below a second predefined load level.

In some embodiments, the node 600 is operative such that the second event occurs when said second one of said nodes goes below a first predefined load level, said first one of said nodes is above a second predefined load level and said third one of said nodes is below a third load level.

In some embodiments, the node 600 is operative such that said first and/or second event occur by a manual instruction from an administration user interface.

In some embodiments, the node 600 is operative such that said load balancing is a load balancing of processing and/or bandwidth usage.

Load balancing may also be carried out for purposes other than processor and bandwidth capacity or optimization, e.g. for purposes like energy consumption, network latency and software and upgrade plans requiring changes in topology on the fly.

There are also cases where the load balancing according to the present invention could be utilized in conference topologies not being separated by a firewall. For example in large corporate networks, and in video conferencing service networks providing cloud conferencing services, where the presence of several available nodes and processor requires a load balancing on the fly to optimize resource utilization.

Unlike what is known from prior art, the present invention provides a novel way of accomplishing load balancing, bandwidth usage and resource optimization on the fly during an ongoing conference.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the invention, which is limited only by the following claims.

What is claimed is:

1. A method for load balancing in a multimedia conference involving at least one internal terminal and at least one internal node separated from at least one external terminal and at least one external node by a firewall, wherein media data from at least one of one of the at least on internal terminal and at least one external terminal received at at least a first one of one of the at least one internal node and the at least one external node are forwarded through the firewall to at least a second one of one of the at least one internal node and the at least one external node, and received media data at the at least the second one of one of the at least one internal node and the at least one external node are processed by said second one of one of the at least one internal node and the at least one external node, comprising:
    at a first event, reconfiguring said first one of one of the at least one internal node and the at least one external node to process received media data, and reconfiguring said second one of one of the at least one internal node and the at least one external node to forward received media data to said first one of one of the at least one internal node and the at least one external node;
    at a second event, loading at least a part of said received media data being processed at one of the first one and second one of one of the at least one internal node and the at least one external node to at least a third one of one of the at least one internal node and the at least one external node; and
    standardized communication sessions according to one of H.323, Session Initiation Protocol (SIP) and WebRTC are only established between the at least one internal terminal and at least one internal node, and between the at least one external terminal and at least one external node, respectively, and forwarding of media data between one of the at least one internal node and the at least one external node are depending on standardized communication sessions.

2. The method according to claim 1, wherein said first one of one of the at least one internal node and at least one external node are among said at least one external node.

3. The method according to claim 1, wherein said first one of one of the at least one internal node and at least one external node are among said at least one internal node.

4. The method according to claim 1, wherein the at least a part of said received media data being processed at one of the first one and second one of one of the at least one internal node and the at least one external node are all media being processed at one of the second one and first one of one of the at least one internal node and the at least one external node, and
    instructing terminals being transmitted and, nodes being forwarded said received media at one of the second one and first one of one of the at least one internal node and the at least one external node to start one of transmitting and forwarding said received media data to the third one of one of the at least one internal node and the at least one external node.

5. The method according to claim 2, wherein the media data are audio and video formatted according to one of Real-time Transport Protocol (RTP) and Real Time Messaging Protocol (RTMP).

6. The method according to claim 1, wherein the first event occurs when said second one of one of the at least one internal node and at least one external node exceeds a first predefined load level and said first one of one of the at least one internal node and the at least one external node is below a second predefined load level.

7. The method according to claim 1, wherein the second event occurs when said second one of one of the at least one internal node and the at least one external node goes below a first predefined load level, said first one of one of the at least one internal node and the at least one external node is above a second predefined load level and said third one of one of the at least one internal node and the at least one external node is below a third load level.

8. The method according to claim 1, wherein at least one of said first and second event occur by a manual instruction from an administration user interface.

9. The method according to claim 1, wherein said load balancing is a load balancing of at least one of processing and bandwidth usage.

10. A node for load balancing in a multimedia conference involving at least one internal terminal and at least one internal node separated from at least one external terminals and at least one external node by a firewall, wherein media data from at least one of one of the at least on internal terminal and at least one external terminal received at at least a first one of one of the at least one internal node and at least one external node are forwarded through the firewall to at least a second one of one of the at least one internal node and at least one external node, and received media data at the at least a second one of one of the at least one internal node and at least one external node are processed by said second one of one of the at least one internal node and at least one external node, the node comprising input/output circuitry, a processor and a memory, said memory containing instructions executable by said processor whereby said node is configured to:
    at a first event, reconfigure said first one of one of the at least one internal node and at least one external node to process received media data, and reconfigure said second one of one of the at least one internal node and at least one external node to forward received media data to said first one of one of the at least one internal node and at least one external node,
    at a second event, load at least a part of said received media data being processed at one of the first one and second one of one of the at least one internal node and at least one external node to at least a third one of one of the at least one internal node and at least one external node; and standardized communication sessions according to one of H.323, Session Initiation Protocol (SIP) and WebRTC are only established between the at least one internal terminal and at least one internal node, and between the at least one external terminal and at least one external node, respectively, and forwarding of media data between one of the at least one internal node and the at least one external node are depending on standardized communication sessions.

11. A computer readable medium comprising instructions for load balancing in a multimedia conference involving at least one internal terminal and at least one internal node separated from at least one external terminals and at least one external node by a firewall, wherein media data from at least one of one of the at least on internal terminal and at least one external terminal received at at least a first one of one of the at least one internal node and at least one external node are forwarded through the firewall to at least a second one of one of the at least one internal node and at least one external node, and received media data at the at least a second one of one of the at least one internal node and at least one external node are processed by said second one of one of the at least one internal node and at least one external node, the instructions, when executed on at least one processor, cause the processor to:

at a first event, reconfigure said first one of one of the at least one internal node and the at least one external node to process received media data, and reconfigure said second one of one of the at least one internal node and the at least one external node to forward received media data to said first one of one of the at least one internal node and the at least one external node;

at a second event, load at least a part of said received media data being processed at one of the first one and second one of one of the at least one internal node and the at least one external node to at least a third one of one of the at least one internal node and the at least one external node; and standardized communication sessions according to one of H.323, Session Initiation Protocol (SIP) and WebRTC are only established between the at least one internal terminal and at least one internal node, and between the at least one external terminal and at least one external node, respectively, and forwarding of media data between one of the at least one internal node and the at least one external node are depending on standardized communication sessions.

12. The method according to claim 1, wherein the media data are audio and video formatted according to one of Real-time Transport Protocol (RTP) and Real Time Messaging Protocol (RTMP).

13. The method according to claim 12, wherein the first event occurs when said second one of one of the at least one internal node and at least one external node exceeds a first predefined load level and said first one of one of the at least one internal node and the at least one external node is below a second predefined load level.

14. The method according to claim 13, wherein the second event occurs when said second one of one of the at least one internal node and the at least one external node goes below a first predefined load level, said first one of one of the at least one internal node and the at least one external node is above a second predefined load level and said third one of one of the at least one internal node and the at least one external node is below a third load level.

15. The method according to claim 14, wherein at least one of said first and second event occur by a manual instruction from an administration user interface.

16. The method according to claim 15, wherein said load balancing is a load balancing of at least one of processing and bandwidth usage.

17. The node according to claim 10, wherein the first event occurs when said second one of one of the at least one internal node and at least one external node exceeds a first predefined load level and said first one of one of the at least one internal node and the at least one external node is below a second predefined load level.

18. The node according to claim 10, wherein the second event occurs when said second one of one of the at least one internal node and the at least one external node goes below a first predefined load level, said first one of one of the at least one internal node and the at least one external node is above a second predefined load level and said third one of one of the at least one internal node and the at least one external node is below a third load level.

* * * * *